(12) United States Patent
    Hood

(10) Patent No.: US 12,628,980 B2
(45) Date of Patent: May 19, 2026

(54) HEAT LAMP

(71) Applicant: Spring (U.S.A.) Corporation, Naperville, IL (US)

(72) Inventor: Lauren Hood, Oswego, IL (US)

(73) Assignee: Spring (U.S.A.) Corporation, Naperville, IL (US)

( * ) Notice: Subject to any disclaimer, the term of this patent is extended or adjusted under 35 U.S.C. 154(b) by 0 days.

(21) Appl. No.: 18/206,836

(22) Filed: Jun. 7, 2023

(65) Prior Publication Data

US 2023/0309740 A1    Oct. 5, 2023

Related U.S. Application Data

(63) Continuation of application No. 16/699,393, filed on Nov. 29, 2019, now Pat. No. 11,717,108.

(60) Provisional application No. 62/772,381, filed on Nov. 28, 2018.

(51) Int. Cl.
    *A47J 36/24* (2006.01)
    *F21L 14/00* (2006.01)
    *F21V 33/00* (2006.01)
    *H05B 3/00* (2006.01)
(52) U.S. Cl.
    CPC ........... *A47J 36/2488* (2013.01); *F21L 14/00* (2013.01); *F21V 33/0092* (2013.01); *H05B 3/0071* (2013.01)
(58) Field of Classification Search
    CPC ................. A47J 36/2488; F21L 14/00; F21V 33/0092; H05B 3/0071
    See application file for complete search history.

(56) References Cited

U.S. PATENT DOCUMENTS

| | | | |
|---|---|---|---|
| 1,684,081 A | 9/1928 | Akers | |
| 3,360,640 A | 12/1967 | Seitz et al. | |
| 4,692,849 A | 9/1987 | Le Vantine | |
| 4,977,489 A | 12/1990 | Fung | |

(Continued)

FOREIGN PATENT DOCUMENTS

| | | | | |
|---|---|---|---|---|
| DE | 202005016736 U1 * | 3/2006 | ............. | A47F 3/001 |
| JP | 2000139727 A | 5/2000 | | |

OTHER PUBLICATIONS

DE-202005016736-U1, Mar. 2006, Beer Grill, partial translation (Year: 2006).*
Hatco "Strip Heater Solutions", Jan. 2018 (Year: 2018), pp. 37.

*Primary Examiner* — Elizabeth M Kerr
*Assistant Examiner* — Fahmida Ferdousi
(74) *Attorney, Agent, or Firm* — Banner & Witcoff, Ltd.

(57) ABSTRACT

A heat lamp is provided that minimizes visual obstructions between an individual and a food service line, while more evenly distributing heat across food. The heat energy penetrates into the food and does not merely heat the surface. Different heating capabilities can be provided by locating the lamp head at different positions over a large adjustable height range. Additional lighting elements provide illumination to heated surfaces to improve visual appeal. Each heat lamp on a service line may be connected to an adjacent heat lamp through built-in power receptacles. The surfaces of the heat lamp are sealed and/or made of easily cleaned substances and have features compliant to one or more industry standards. The heat lamp may be easily transportable and may be resistant to damage.

19 Claims, 24 Drawing Sheets

(56)                  References Cited

U.S. PATENT DOCUMENTS

| 6,019,484 | A  | * | 2/2000 | Seyler | ................... | F21V 21/22 |
| | | | | | | 362/403 |
| 6,031,208 | A | | 2/2000 | Witt et al. | | |
| RE36,724 | E | | 6/2000 | Westerberg et al. | | |
| 6,259,065 | B1 | | 7/2001 | Hohler et al. | | |
| 6,261,621 | B1 | | 7/2001 | Stanger et al. | | |
| 6,417,494 | B1 | | 7/2002 | Westerberg et al. | | |
| D484,998 | S | | 1/2004 | Cvek | | |
| 6,814,473 | B2 | | 11/2004 | Chen | | |
| D499,828 | S | | 12/2004 | Martin et al. | | |
| D517,713 | S | | 3/2006 | Waldmann | | |
| D528,691 | S | | 9/2006 | Waldmann | | |
| D582,087 | S | | 12/2008 | Su | | |
| D600,844 | S | | 9/2009 | Thomson et al. | | |
| D619,746 | S | | 7/2010 | Huang | | |
| D620,165 | S | | 7/2010 | Huang | | |
| D623,332 | S | | 9/2010 | Huang | | |
| D623,333 | S | | 9/2010 | Huang | | |
| D623,334 | S | | 9/2010 | Huang | | |
| D635,707 | S | | 4/2011 | Ng et al. | | |
| D651,734 | S | | 1/2012 | Li | | |
| D654,199 | S | | 2/2012 | Xie | | |
| D655,140 | S | | 3/2012 | Saunders et al. | | |
| D681,865 | S | | 5/2013 | Lee | | |
| D690,861 | S | | 10/2013 | Huang | | |
| 8,723,086 | B2 | | 5/2014 | McMahan | | |
| 8,761,588 | B2 | | 6/2014 | Lee | | |
| 8,764,219 | B2 | | 7/2014 | Hasan et al. | | |
| 8,858,044 | B2 | * | 10/2014 | Tang | ....................... | F21V 21/26 |
| | | | | | | 362/228 |
| 8,948,579 | B2 | | 2/2015 | Lee | | |
| D744,693 | S | | 12/2015 | Kitts | | |
| D759,289 | S | | 6/2016 | Newhouse et al. | | |
| D776,319 | S | | 1/2017 | Sato | | |
| D835,330 | S | * | 12/2018 | Richardson | ................. | D26/107 |
| D889,023 | S | | 6/2020 | Sun | | |
| 10,791,590 | B2 | | 9/2020 | Scanlon | | |
| 11,320,141 | B1 | | 5/2022 | Puckett | | |
| 2007/0299558 | A1 | | 12/2007 | Nelson et al. | | |
| 2008/0285273 | A1 | | 11/2008 | Liu et al. | | |
| 2008/0291673 | A1 | | 11/2008 | Chen et al. | | |
| 2010/0012862 | A1 | | 1/2010 | Chang | | |
| 2010/0039792 | A1 | | 2/2010 | Meyers et al. | | |
| 2010/0271817 | A1 | | 10/2010 | Chung et al. | | |
| 2010/0315801 | A1 | | 12/2010 | Wu et al. | | |
| 2011/0051437 | A1 | * | 3/2011 | Ng | .......................... | F21S 6/003 |
| | | | | | | 362/418 |
| 2012/0145699 | A1 | * | 6/2012 | McMahan | ............ | H05B 3/0076 |
| | | | | | | 219/533 |
| 2012/0212941 | A1 | | 8/2012 | Reschreiter | | |
| 2014/0003069 | A1 | * | 1/2014 | Polick | ....................... | F21S 6/00 |
| | | | | | | 362/427 |
| 2014/0254135 | A1 | | 9/2014 | Nolan et al. | | |
| 2017/0055754 | A1 | | 3/2017 | Lee et al. | | |
| 2017/0216616 | A1 | | 8/2017 | Boyajian et al. | | |
| 2017/0223775 | A1 | | 8/2017 | Scanlon | | |
| 2017/0325629 | A1 | * | 11/2017 | Scanlon | ................. | F21V 29/83 |
| 2021/0038018 | A1 | | 2/2021 | Hundley et al. | | |

* cited by examiner

810

(max height)

(mid height 90°)

(mid height 80)

(packed)

(max height)

(mid height)

HEAT LAMP

RELATED APPLICATIONS

This application is a continuation of U.S. application Ser. No. 16/699,393 filed Nov. 29, 2019 which claims priority to U.S. Provisional Patent Application No. 62/772,381 filed Nov. 28, 2018, which is incorporated by reference in its entirety herein.

FIELD OF THE DISCLOSURE

Certain aspects of this disclosure relate to heating, warming, and/or illuminating food. In particular, certain aspects of the invention relate to food-serving systems, components thereof, and methods of serving food including heating and lighting the food from an element disposed above the food.

BACKGROUND OF THE DISCLOSURE

Restaurants and other food service establishments often make food items readily available to their customers via buffets, salad bars, breakfast bars, or similar set-ups allowing customers to serve themselves. To ensure the safety of certain food items, it is often necessary to ensure that the food items maintain a certain elevated temperature, and for other food items, it is often desirable to serve the items at relatively warm or hot temperatures for the customer's enjoyment.

Additionally, to ensuring food safety, it is also desirable that the serving set-ups present the food items in a convenient, safe, and aesthetically pleasing manner. Often, a food service facility may desire to fully display and illuminate the food items to increase their appeal to the customer. Therefore, setups that partially or fully obstruct the customer's view of the food, for example through opaque components such as pan covers, or clear components that "fog up" and/or collect condensation from hot food items in a manner that obstructs a customer's view, may not be desirable even if they otherwise provide the necessary sanitation benefits. In addition, serving devices such as metal pans may have high temperatures that present the risk of burns if a customer comes in contact with the pan. Still more, enclosed containers that require removal of a cover or use of various access doors are also inconvenient for customers because they require customers to perform additional actions to access the items they want. Devices relying on heated air also use relatively large amounts of energy to keep food warm, especially those with open areas that provide access that allow heated air to flow out of the container, or that require use of heated air curtains to minimize outflow. Heated air may also dry out the food items and/or otherwise adversely affect the appearance of the food items. In some cases, existing heat lamps may additionally emit light in a visible spectrum that may change the appearance of the food being heated, such as by illuminating the heated food with a red wavelength of light that may also change the appearance of the food.

To alleviate such possible inefficiencies, it may be desirable to provide food-serving systems and methods that maintain safe and sanitary conditions by heating food items in a manner that presents the food items in an appealing manner and allows customers to conveniently view and access any desired food items. Additionally, it would be desirable to provide systems and methods that do so in an energy-efficient manner. Further, it would be desirable to provide systems and methods that may enhance the appearance of the food items through illumination.

SUMMARY OF THE DISCLOSURE

The following presents a simplified summary in order to provide a basic understanding of some aspects of the disclosure. The summary is not an extensive overview of the disclosure. It is intended neither to identify key or critical elements of the disclosure nor to delineate the scope of the disclosure. The following summary merely presents some concepts of the disclosure in a simplified form as a prelude to the description below.

Aspects of the disclosure provide effective, efficient, scalable, and convenient technical solutions that address and overcome the technical problems associated with heating and/or illuminating food items.

Aspects of the disclosure provide a modernized food-warming lamp that minimizes visual obstructions between a buffet customer and the service line while more evenly distributing heat across food. The heat energy penetrates into the food and does not merely heat the surface. Different heating capabilities can be provided by locating the lamp head at different positions over a large adjustable height range. Additional lighting elements provide illumination to heated surfaces to improve visual appeal. Each heat lamp on a service line may be connected to an adjacent heat lamp through built-in power receptacles. The surfaces of the heat lamp are sealed and/or made of easily cleaned substances and have features compliant to one or more industry standards. The heat lamp may be easily transportable and may be resistant to damage.

BRIEF DESCRIPTION OF THE DRAWINGS

The present disclosure is illustrated by way of example and not limited in the accompanying figures in which like reference numerals indicate similar elements and in which.

DETAILED DESCRIPTION

In the following description of various examples of food-serving methods, systems, and/or components described in this disclosure, reference is made to the accompanying drawings, which form a part hereof, and in which are shown by way of illustration various illustrative structures and environments in which aspects of the disclosure may be practiced. It is to be understood that other structures and environments may be utilized and that structural and functional modifications may be made from the specifically described structures and methods without departing from the scope of the present disclosure. Moreover, the figures of this disclosure may represent the scale and/or dimensions according to one or more embodiments, and as such contribute to the teaching of such dimensional scaling. However, those skilled in the art will readily appreciate that the disclosure herein is not limited to the scales, dimensions, proportions, and/or orientations shown in the figures.

The illustrative embodiments, apparatuses, and methods described herein provide, inter alia, systems for heating and illuminating food, components of such systems and methods of heating and illuminating food. These and other aspects, features, and advantages of described in this disclosure or of certain illustrative examples described in the disclosure will be further understood by those skilled in the art from the following description of the illustrative examples.

Figure 1A:
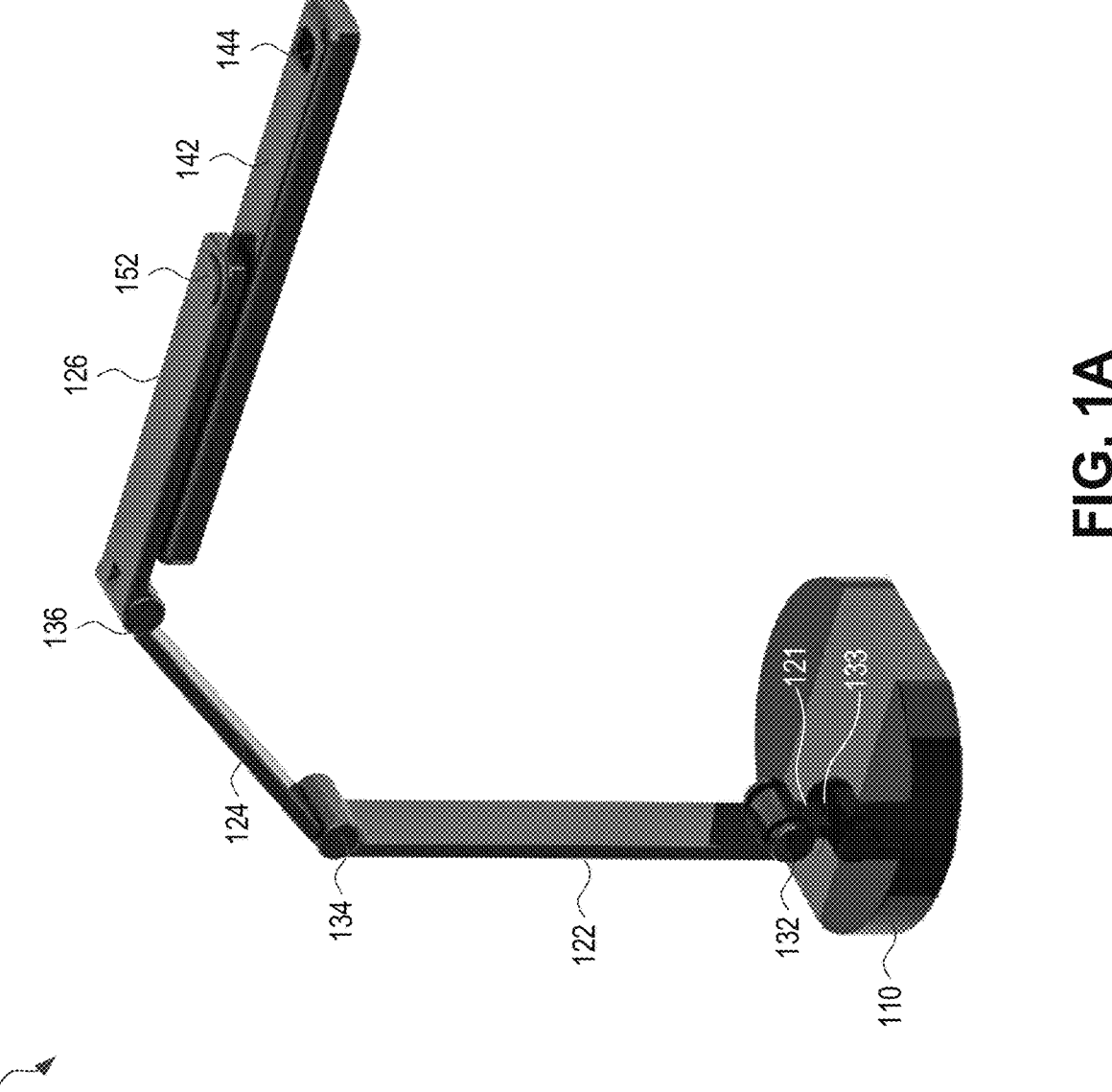
FIG. 1A shows an example of an illustrative heat lamp according to one or more aspects described herein.

FIG. 1A shows an example of an illustrative heat lamp according to one or more aspects described herein. Some aspects of this disclosure relate to a food serving system. In some cases, the illustrative heat lamp 100 may be used to heat and/or illuminate other kind of objects. In some cases, the heat lamp 100 may be a unitary food-warming lamp, while in some cases the heat lamp 100 may be modular and configured to fit and/or interact with one or more other devices and/or components including a plurality of food warming lamps on a food service line. FIG. 1A shows a perspective view of an illustrative example of a heat lamp 100. In this example, the heat lamp 100 includes a base 110, a plurality of segments 122, 124, 126, a plurality of pivots 132, 133, 134, 136 (e.g., hinges, etc.) coupled to the segments, a lamp head 142 that may include one or more openings 144. The lamp head 142 may be coupled to a segment via a pivot 152.

Figure 15:
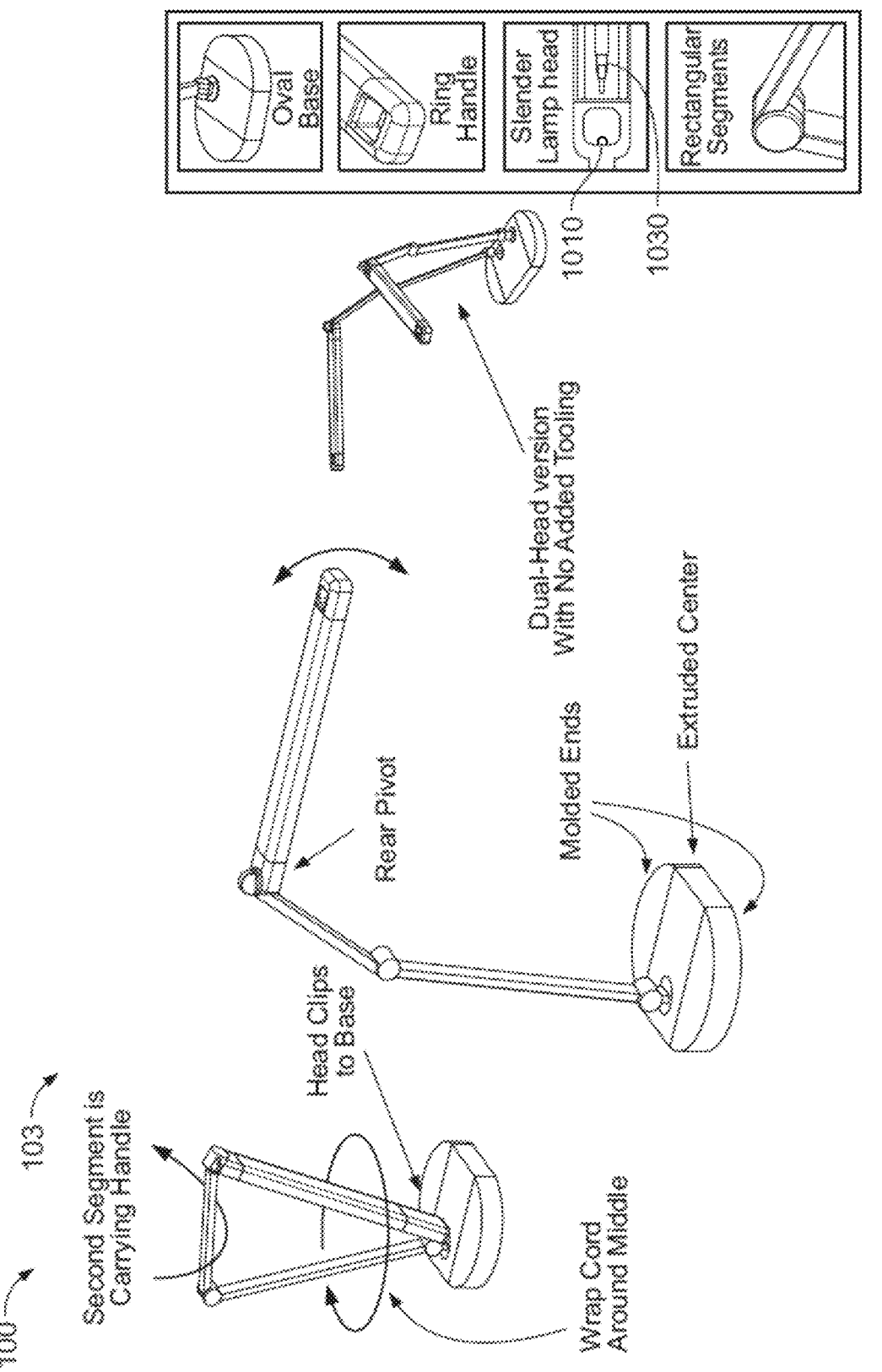
FIGS. 15, 16, 17, 18, 19, and 20 show illustrative views of a heat lamp having a rear pivot configuration according to one or more aspects described herein.
Figure 16:
Figure 17:
Figure 18:
Figure 19:
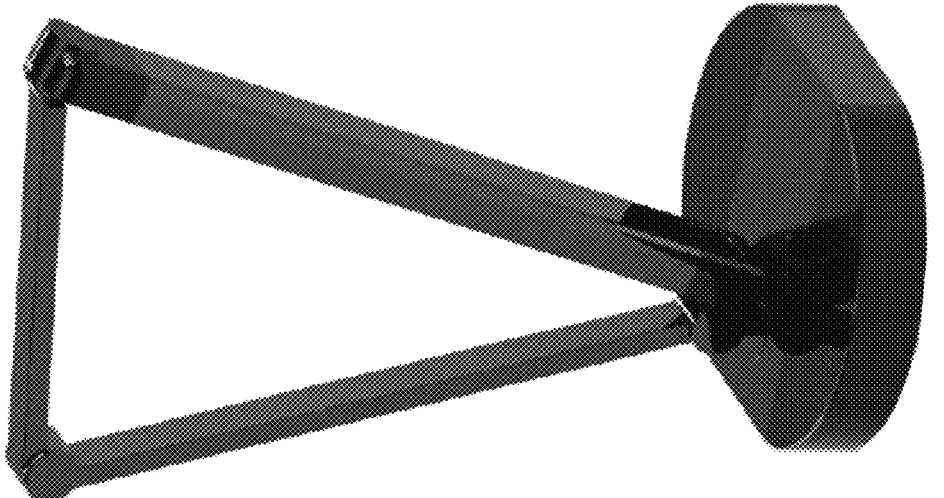
Figure 20:

In some cases, the base 110 may be a composed of a single component. In other cases, the base 110 may include several components, such as an extruded center and one or more molded ends attached to one or more sides of the extruded center. In an illustrative example, the base 110 may include an extruded center portion having a rectangular shape, where a curved molded end is affixed to opposite sides of the rectangular center portion such that the base comprises an oval shape. Such configurations are illustrative and not meant to be limiting, such that a base may be configured as any one of a number of shapes (e.g., square, rounded, rectangular, etc.) without departing from the scope of this disclosure. The base 110 components may be manufactured of a substantially solid material (e.g., a plastic), may include one or more electrical components such as a power supply, one or more switches, an electrical cord connection, one or more electrical receptacles and the like. In some cases, the multiple components of the base may allow for modifications of the heat lamp 100 without additional tooling requirements. Such modification may include a variable number of switches, a variable number of electrical receptacles, a multi-head lamp design such as the dual head heat lamps shown in FIGS. 15 and 20. In some cases, the pivot 133 recessed in the base may be coupled to a segment 121 or to another pivot, such as the pivot 132.

The illustrative heat lamp 100 may have a power rating in a range between about 100 Watts to about 400 Watts (e.g., about 300 W) at a voltage level common to a consumer market, such as a voltage in a range from about 100 VAC to about 220 VAC at 50 Hertz to about 60 Hertz. An illustrative lamp may be rated at 300 W at 120 VAC at 60 Hz, such as for the North American market. The power cord may be configured for a desired consumer market, such as a North American electrical system, such that the power cord may have three wires of a standard wire gauge (e.g., 12 American Wire Gauge) with a 3-prong grounded plug. The electrical receptacle built into the base may be rated between 10 Amps and 25 Amps (e.g., 20 A) at 120 VAC, wand may be a grounded outlet designed to receive a standard plug of the desired consumer market, such as a standard electrical receptacle for the North American power system, the European power system, and the like. The lamp base 110 may also include overcurrent protection, such as a fuse, rated between 4 A to about 10 Amps (e.g., 5 Amps at 120 VAC). In some cases, the lamp base may include a switch for each element in the lamp head (e.g., a single pole switch) or a switch capable of controlling both the heating element and the lighting element independently or together.

In some cases, the base 110 may have a weight that allows the heat lamp 100 to remain balanced and stable against tipping in all possible configurations of the lamp head over an object being heated and/or illuminated. In some cases, the heat lamp 100 may have a maximum specified weight (e.g., about 10 lbs., about 12 lbs., about 15 lbs., etc.).

In some cases, the base 110 may include an opening, or other attachment point for one or more hinges or pivots, such as the pivots 132 and 133. The pivots may be used to attach and move a lower segment 122 of a support used to elevate the lamp head 142 above a surface to be warmed and/or illuminated. In some cases, a first pivot 132 may be arranged such that an axis of rotation may be parallel to a top surface of the base 110 to allow for an adjustment of an angle of orientation from a plane associated with a top surface of the base 110 and a front face of the segment 122. In some cases, the heat lamp 100 may include the pivot 133 having an axis of rotation perpendicular to the top surface of the base 110, such that the segment 122 may be rotated about this perpendicular axis of rotation to allow the lamp head to be positioned above the lamp base 110 in a number of orientations relative to a front of the base 110. As such, the pivot(s) 132, 133 may allow the lower segment 122 of the support (e.g., a primary arm) to rotate on the vertical access of the base and/or rotate horizontally front back of the base in a limited range.

Figure 11:
Figure 12:
Figure 23:
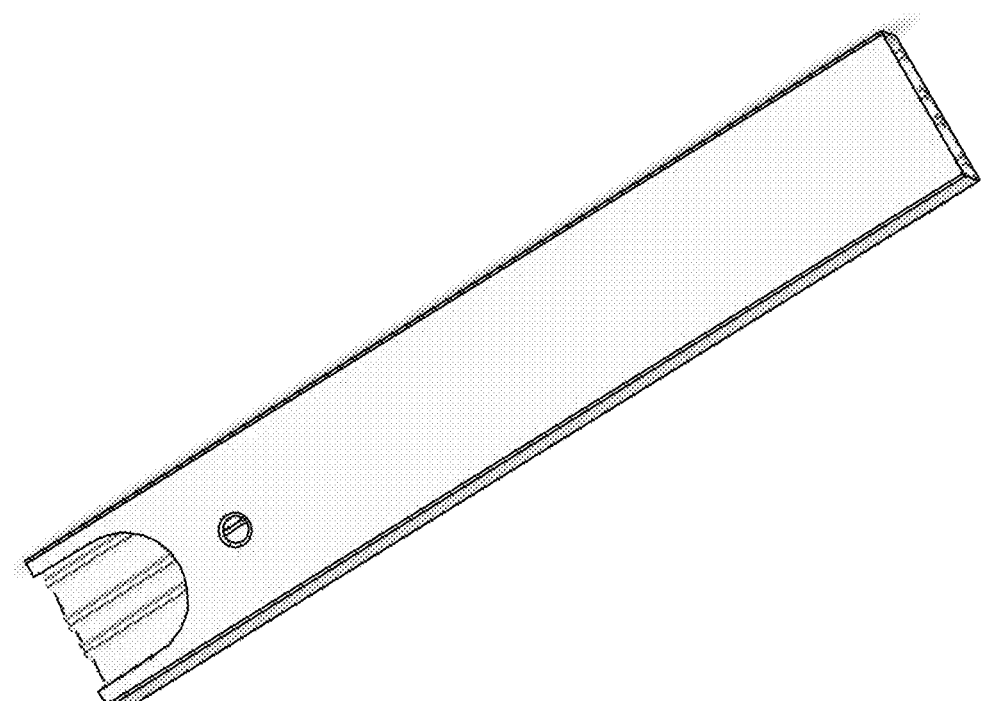
FIG. 23 shows an illustrative view of a lamp arm segment according to one or more aspects described herein.

In the illustrative example of FIG. 1, the segments 122, 124, and 126 form a support arm to support the lamp head 142 above a surface or object to be warmed and/or illuminated. For example, the first segment 122 may be attached to the base 110 via the first pivot 132 and/or the second pivot 133, the second segment 124 may be attached to the first segment with a third pivot 134 and may be attached to the third segment 126 with the fourth pivot 136. While a support arm having three segments 122, 124, and 126 is illustrated, other configurations may be contemplated without departing from the present scope of the disclosure. In some cases, the segments 122, 124, and 126 may have a rectangular cross sectional shape. For example, FIG. 23 shows an illustrative drawing of a segment having a rectangular cross sectional shape. In some cases, one or more of the segments may have a cross-sectional shape different than a rectangular cross sectional shape, such as a circular cross-sectional shape, an oval cross-sectional shape, a hexagonal cross sectional shape, and/or the like. In some cases, the pivots 132, 133, 134, and 136 may be used to position the lamp head 142 horizontally over the surface to be warmed at one or more different heights, such as at a maximum height as shown in FIG. 11, a medium height shown in FIG. 13, a minimum height (not shown) or any height between the maximum height and the minimum height. For example, this large adjustable height range may be within a range between about 10 inches (or lower) to about 25 inches (or other maximum height with the lamp head remaining in a horizontal position. The pivots 132, 133, 134, and 136 may be selected such that the support arm is able to maintain any manually manipulated position without use of a tool or other secondary tightening mechanism. For example, one or more of the pivots 132, 133, 134, and 136 may utilize a frictional force to maintain the desired position. In some cases, each pivot may be locked or otherwise secured (via an internal or external mechanism such as a set screw, lock, clamping mechanism, etc.) so that a desired position may be maintained, even during inadvertent or undesired physical contact with the lamp when in use on a serving line. In some cases, the heat lamp 100 may include pivots that do not require an external tool or secondary tightening mechanism, pivots that allow for tightening by an external tool or secondary tightening mechanism, or a mixture of pivots that do not require any external tool or mechanism for tightening and pivots that do allow for tightening by an external tool or secondary tightening mechanism.

Figure 6:
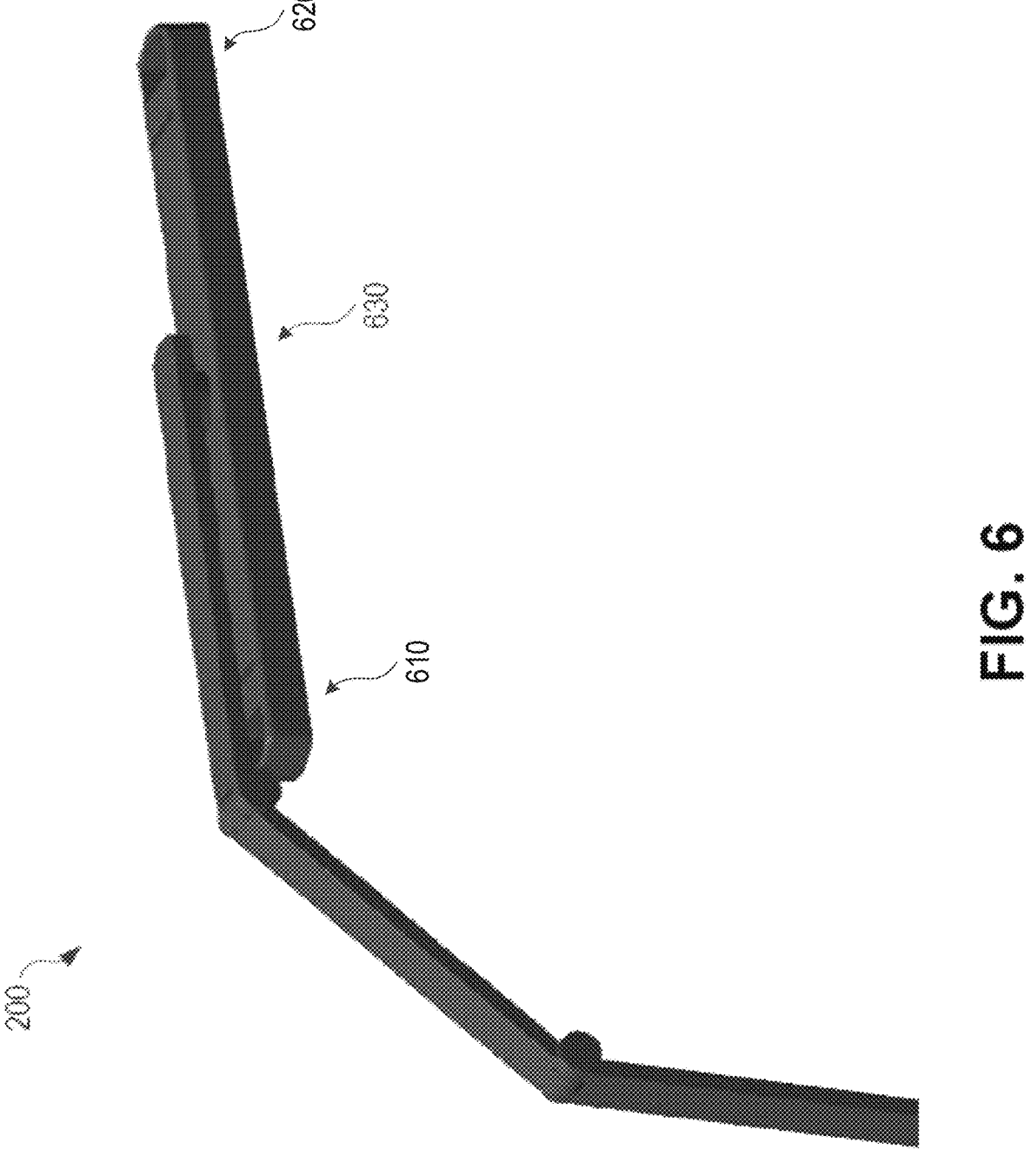
FIGS. 6, 7, and 8 show illustrative views of a lamp head according to one or more aspects described herein.
Figure 7:
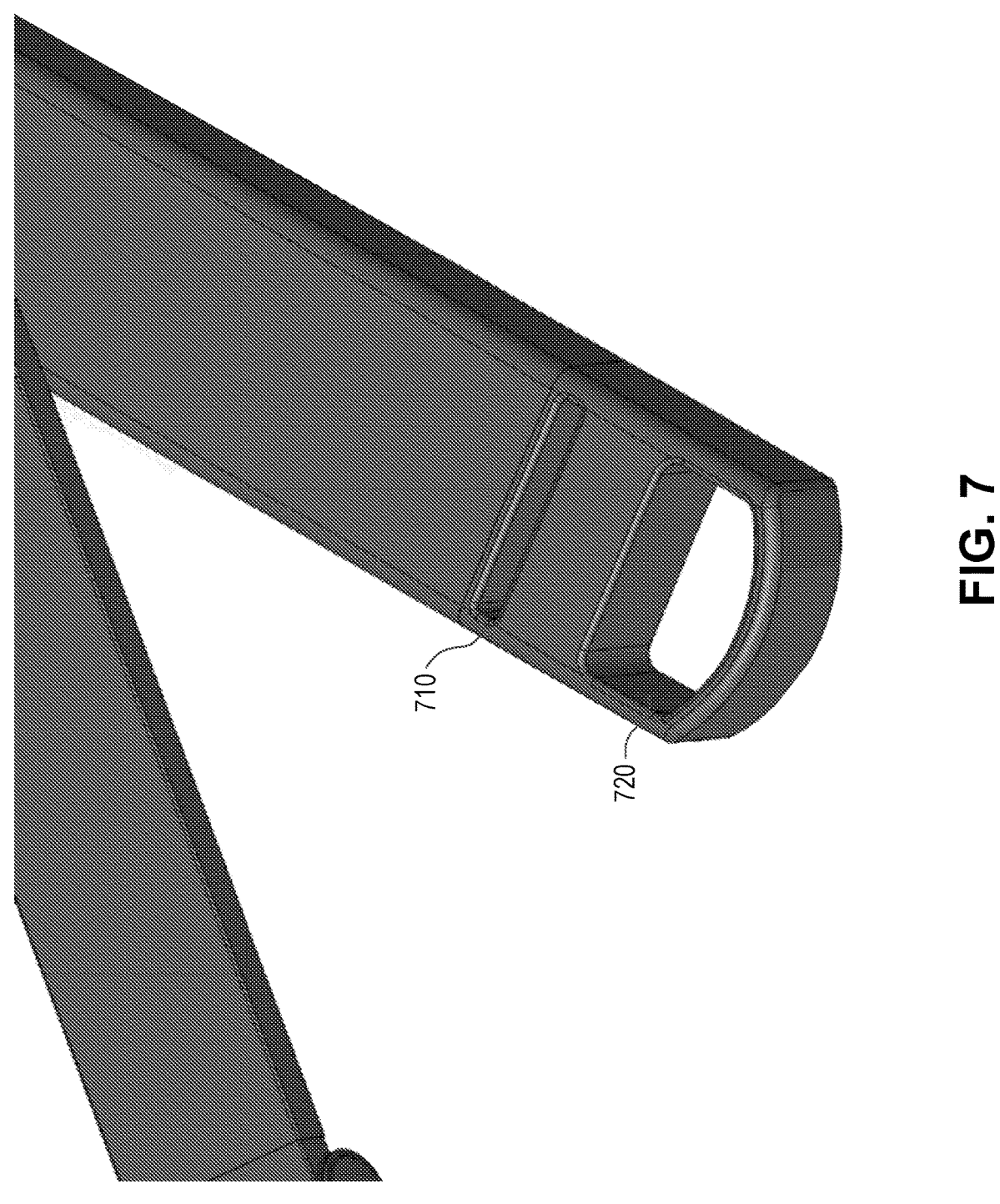
Figure 8:
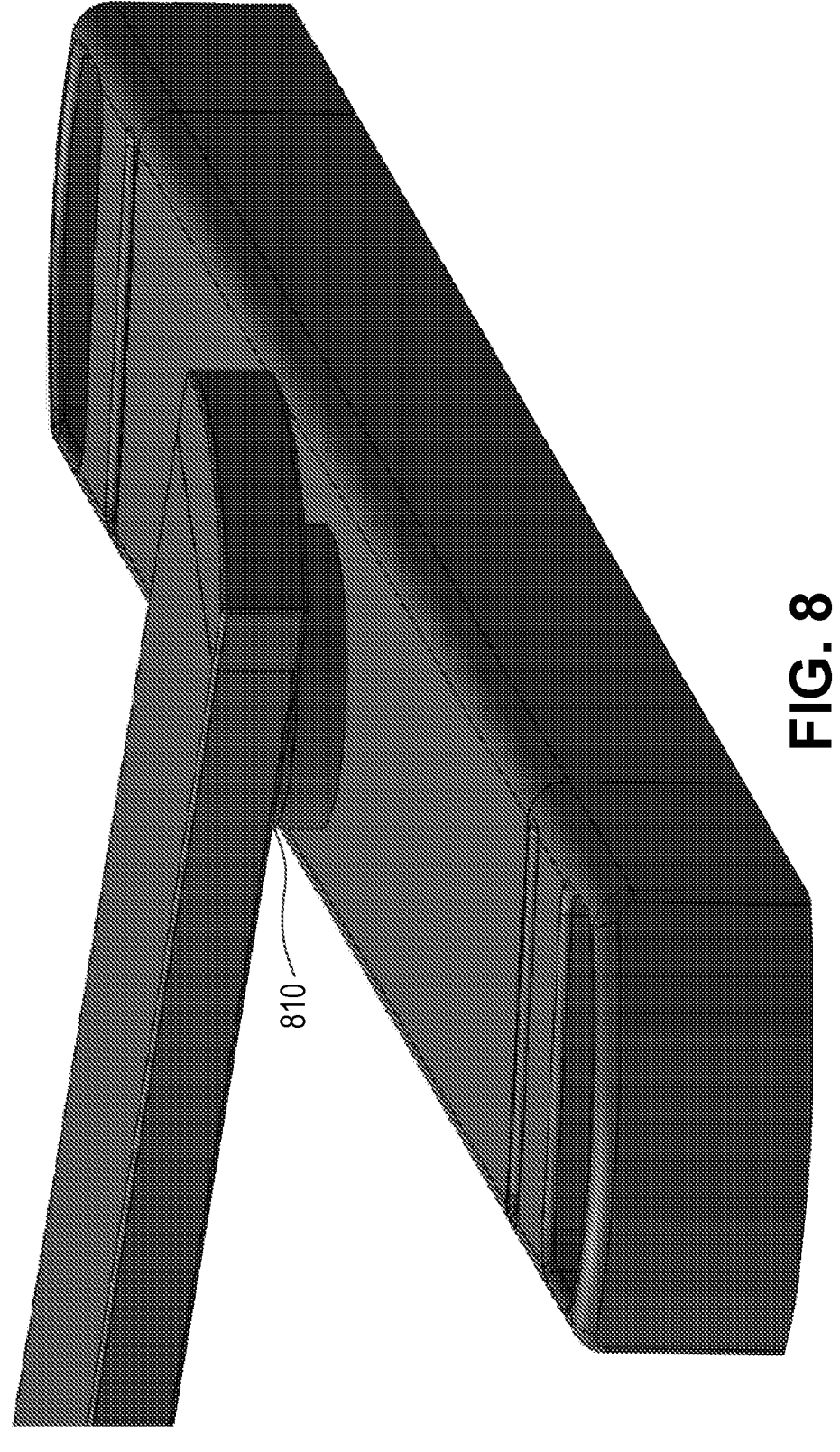
Figure 10:
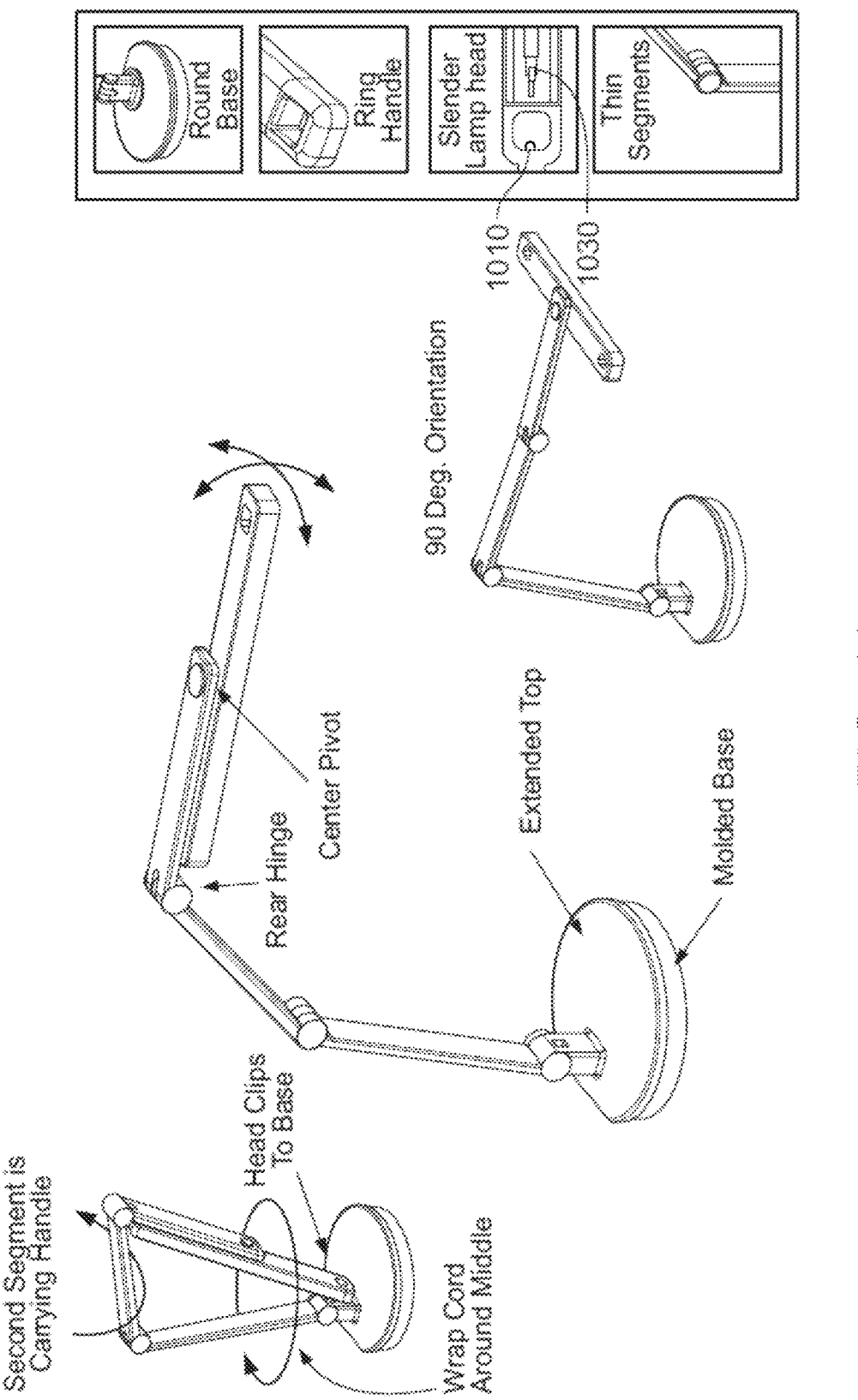
FIGS. 10, 11, 12, 13, and 14 show illustrative views of a heat lamp having a central pivot configuration according to one or more aspects described herein.
Figure 13:
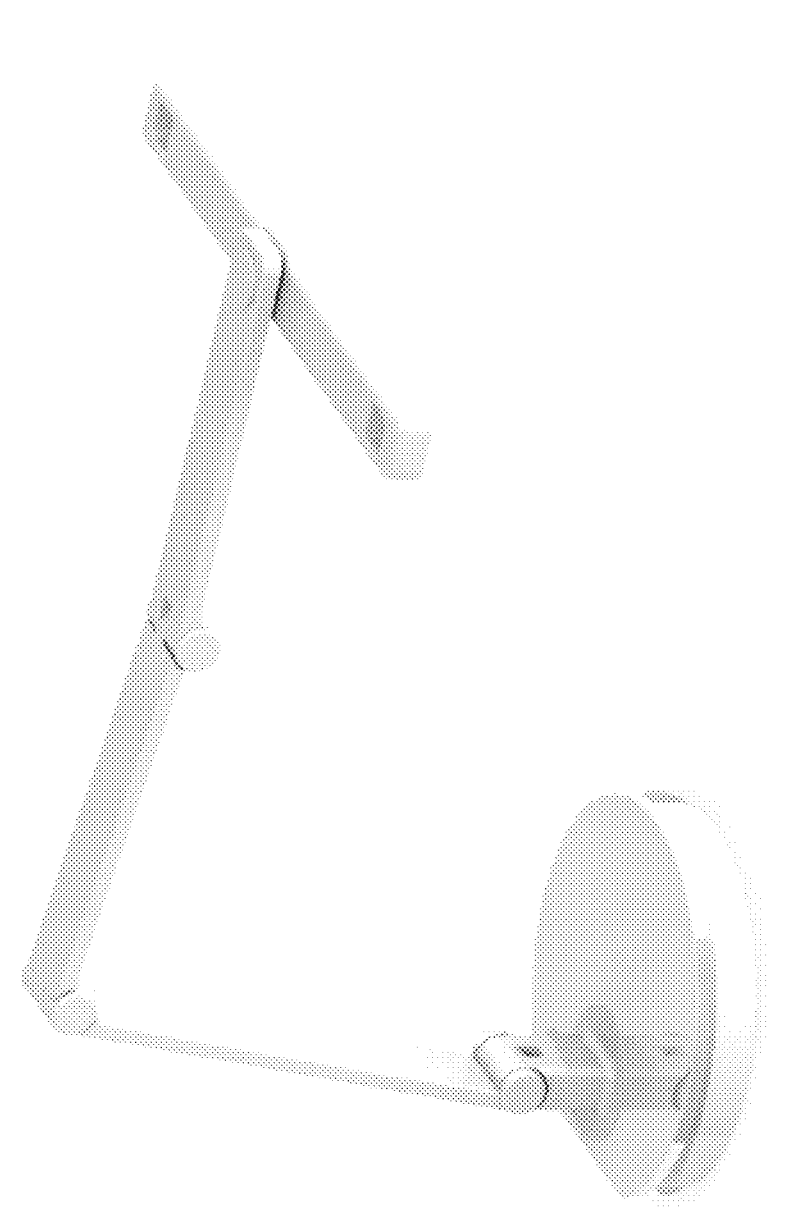
Figure 14:
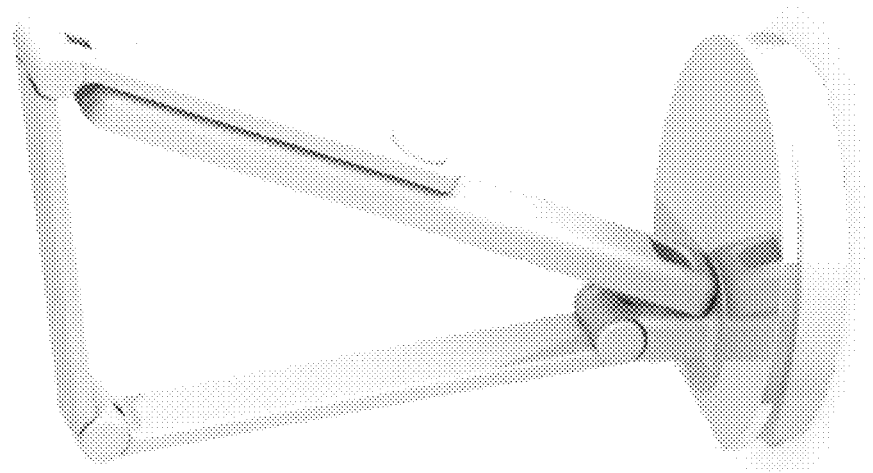

The lamp head 142 may be affixed to the final segment (e.g., the third segment 126) at an attachment point, such as by a pivot 152. In some cases, the pivot 152 may allow the lamp head 142 to rotate from a first position substantially in line with the segments 122, 124, and 126 to a different second position (e.g., a position rotated about 90 degrees with respect to the segment). For example, the lamp head may pivot in the center to allow for 90 degree orientation with respect to the upper arm for alignment in parallel or perpendicular to a service line. FIGS. 1-6 show the lamp head 142 in alignment with the segments of the support arm, FIGS. 8, 10, and 13 show the lamp head at 90 degrees from alignment, and FIG. 7 shows an alignment angle different from 90 degrees.

In some cases, the lamp head may include one or more openings 144 positioned at one or both ends of the lamp head. The openings 144 may be have multiple functions, such as a housing for an illumination light emitting diode (LED) lighting elements (e.g. lighting elements 610 and 620 of FIG. 6 and a lighting element 1010 shown in FIGS. 10 and 15) that may be thermally separated from the infrared (IR) heating element (e.g. a heating element 630 and 620 of FIG. 6 and a heating element 1030 shown in FIGS. 10 and 15). The openings 144 may also function as handles allowing a user to rotate the lamp head into a desired rotational or elevation position. In some cases, the openings, or other such openings, may also serve to clip into a feature near the lamp base pivot for configuring the heat lamp for storage and/or movement. In the storage position, a user may carry the heat lamp 100 by the secondary segment 124.

Figure 1B:
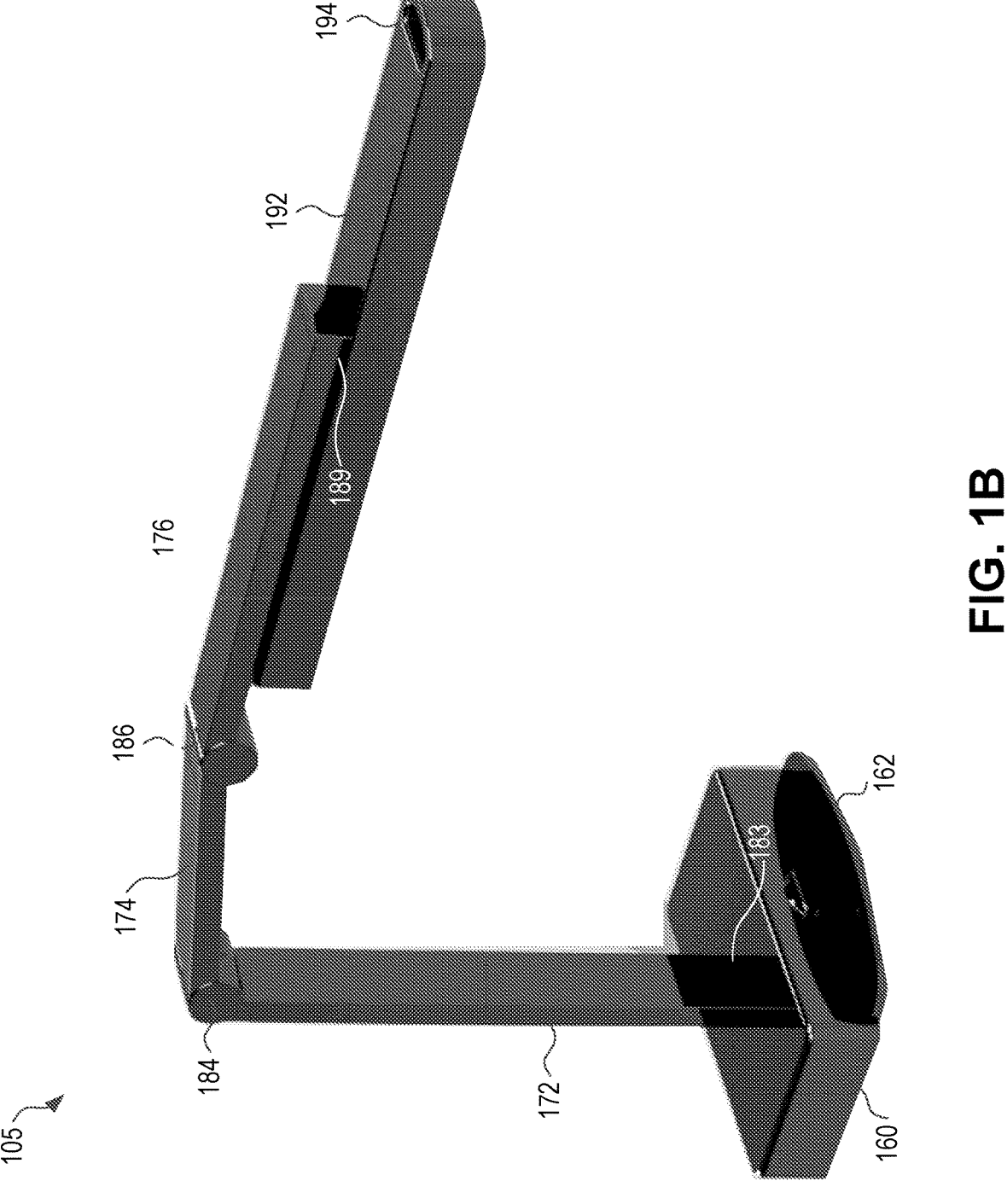
FIG. 1B shows an example of an illustrative heat lamp according to one or more aspects described herein.

FIG. 1B shows an example of an illustrative heat lamp according to one or more aspects described herein. As discussed above, the illustrative heat lamp 105 may be used to heat and/or illuminate food or other objects. In some cases, the heat lamp 105 may include different features than the heat lamp 100 or may include a combination of different features and features similar to those of lamp 100. In some cases, the operation of the heat lamp 105 may be substantially similar to that of the heat lamp 100.

Figure 21:
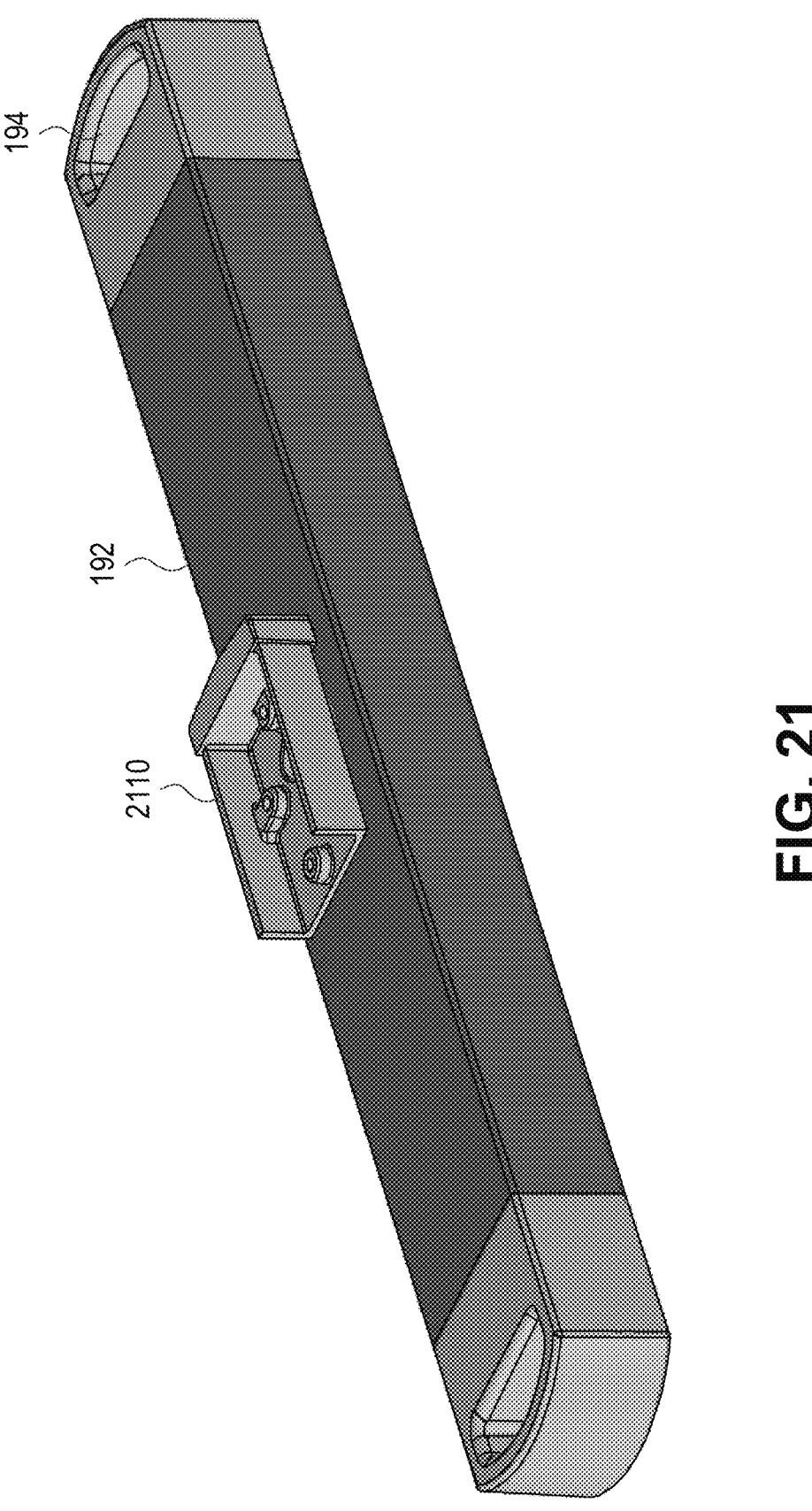
FIG. 21 shows an illustrative view of a lamp head according to one or more aspects described herein.
Figure 22:
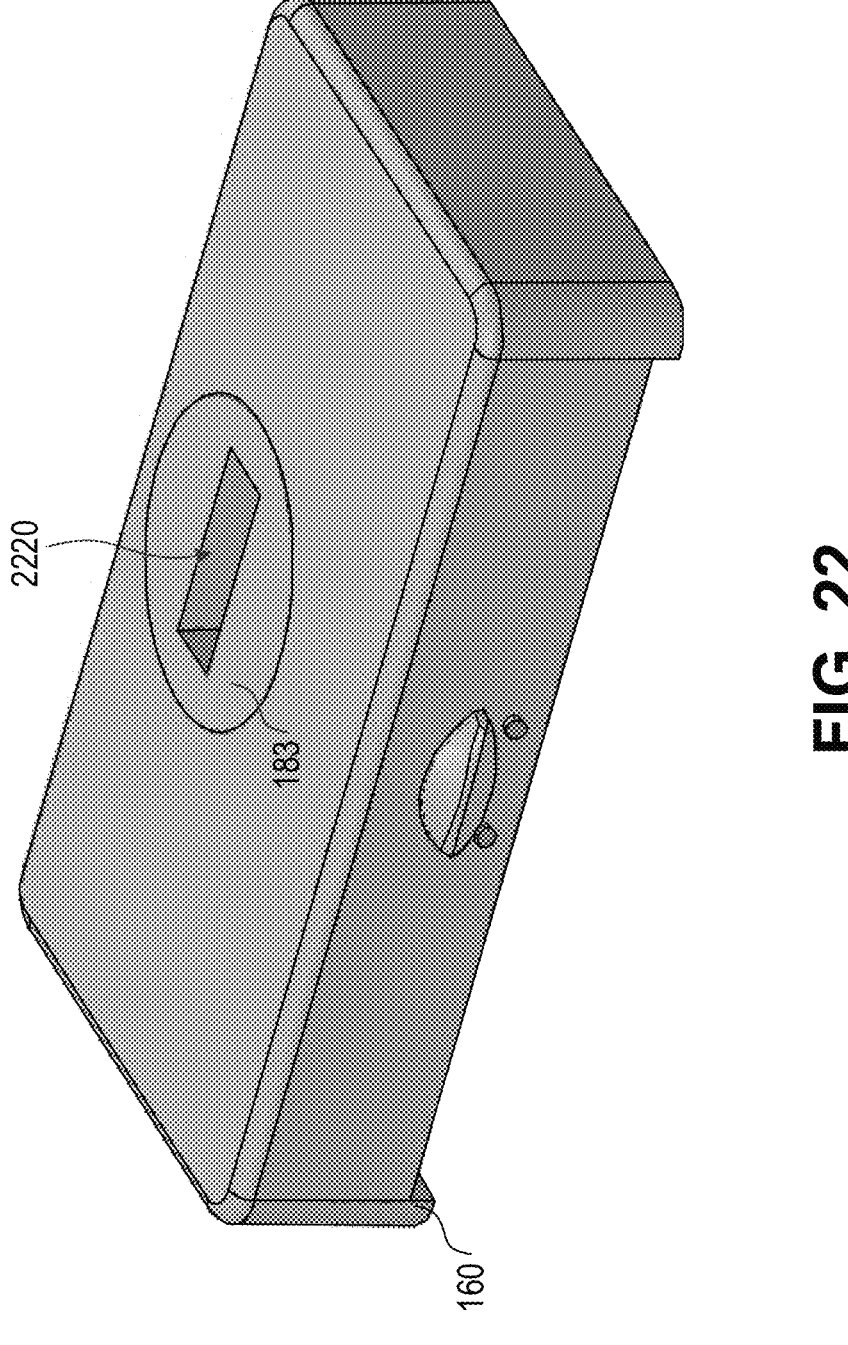
FIG. 22 shows an illustrative view of a lamp base according to one or more aspects described herein.

FIG. 1B shows a perspective view of an illustrative example of a heat lamp 105. In this illustrative example, the heat lamp 105 includes a base 160 (e.g., a rectangular base), a plurality of segments 172, 174, 176, a plurality of pivots 183, 184, 186 (e.g., hinges, rotary connections, etc.) coupled to the segments, a lamp head 192 that may include one or more openings 194. The lamp head 192 may be coupled to a segment via a pivot 189. In some cases, one or more pivots may be visible (e.g., pivots 184, 186), one or more pivots (e.g., pivot 183) may be partially hidden and/or incorporated into surrounding portions of the lamp such as the base, and one or more pivots may be substantially hidden from view (e.g., pivot 189). In the illustrative example of FIG. 1B, the base 160 may include an extension 162 that may be used, for example, to improve overall stability of the lamp 105. FIG. 21 shows an illustrative view of the head 192, including a view of a portion 2110 of the pivot 193, where at least a portion of the pivot 193 is recessed within the segment 176. FIG. 22 shows an illustrative view of the base 160, with lamp controls and status indicators 2210 shown on a front face and an opening 2220 in a pivot integrated into a top surface of the base 160, where the opening 2220 is configured to receive a segment, such as the segment 172.

Figure 2:
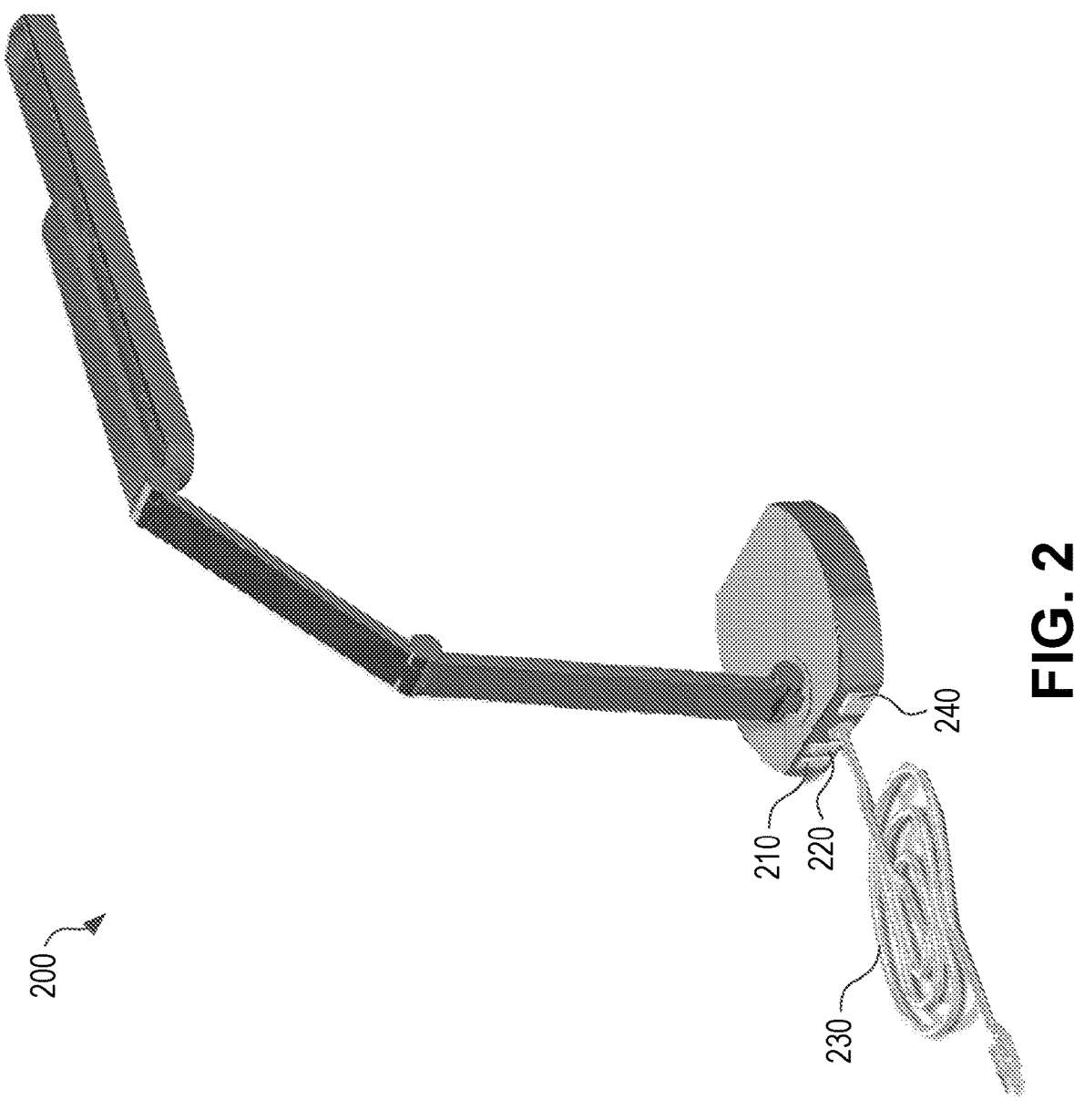
FIG. 2 shows a reverse view of an illustrative heat lamp according to one or more aspects described herein.
Figure 9:
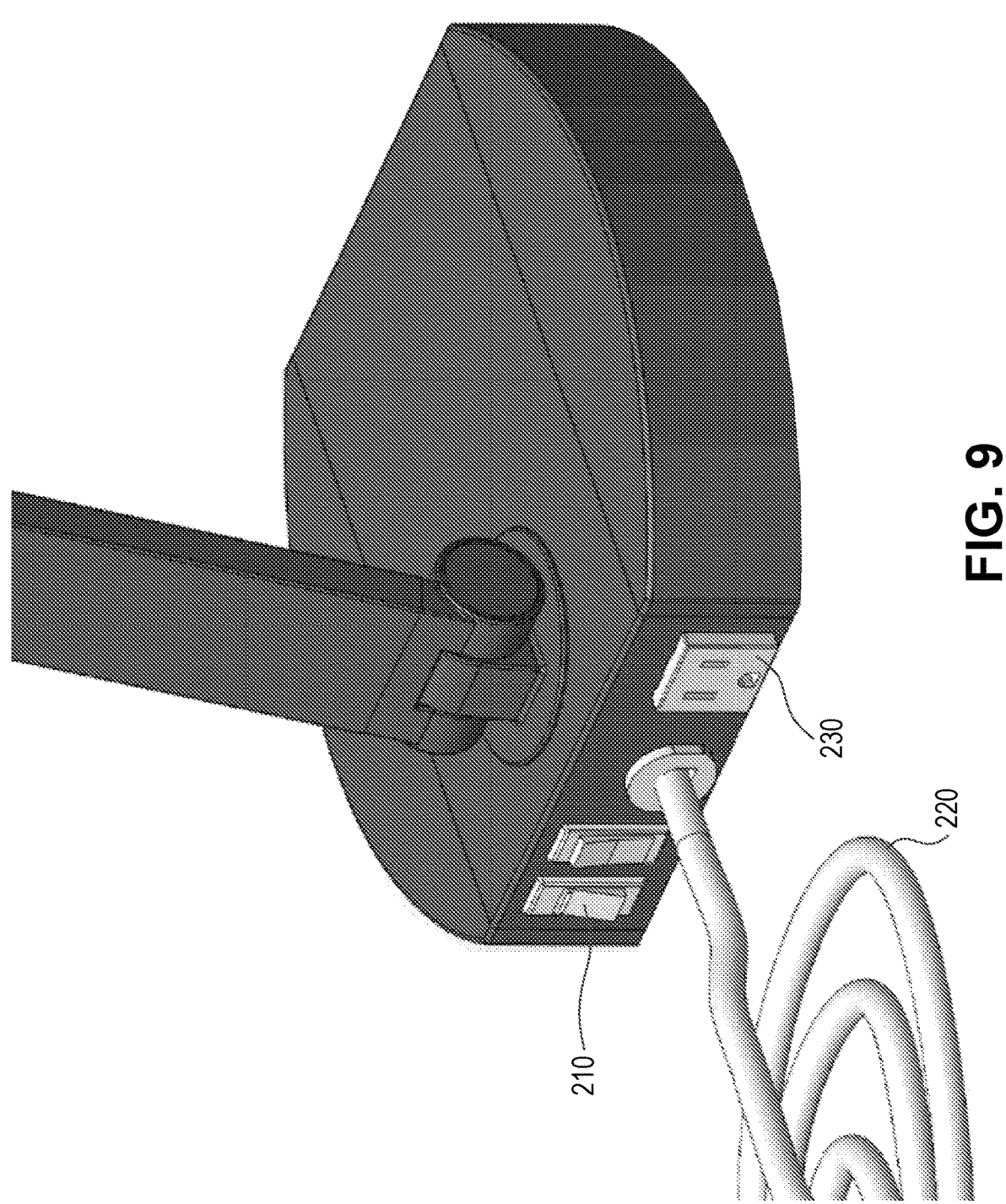
FIG. 9 shows an illustrative view of a lamp base according to one or more aspects described herein.

FIG. 2 shows a reverse view of an illustrative heat lamp 200 according to one or more aspects described herein. FIG. 9 shows an illustrative view of a lamp base according to one or more aspects described herein. The heat lamp 200, as configured, shows a dual switch configuration having a first switch 210 to control the function of an IR heating element in the lamp head and a second switch 220 to control one or more illumination elements (e.g., an LED light). The heat lamp 200 may also include an integral power cord 230 or a detachable power cord along with one or more electrical receptacles 240.

Figure 3:
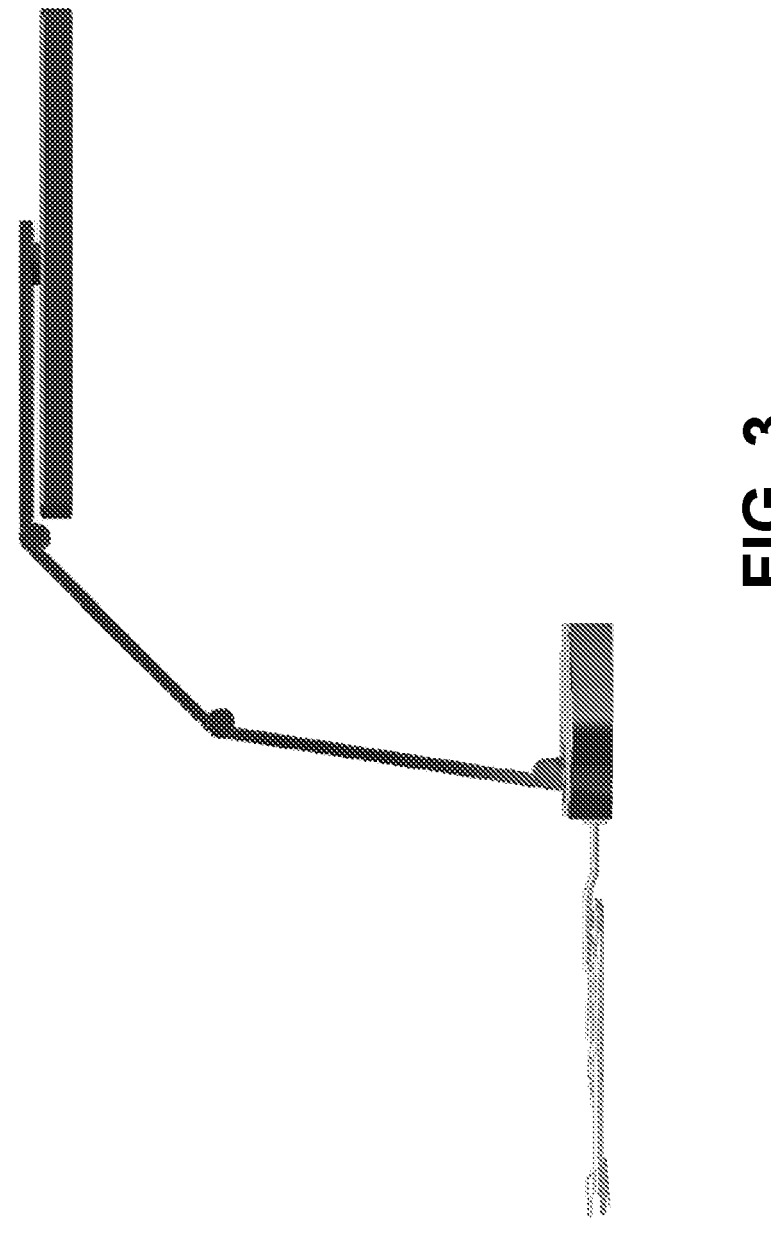
FIGS. 3, 4, and 5 show side views of an illustrative heat lamp according to one or more aspects described herein.
Figure 4:
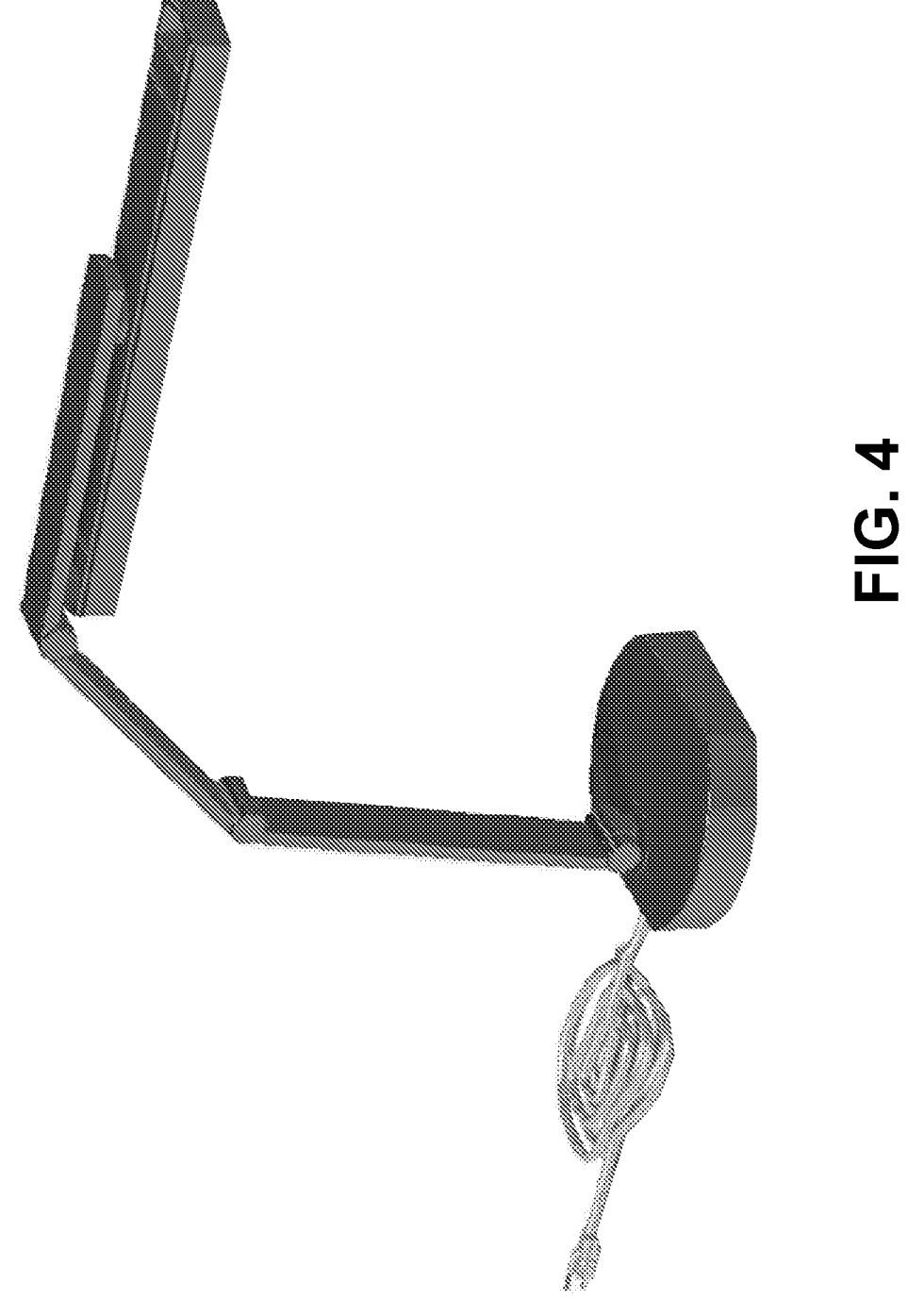
Figure 5:
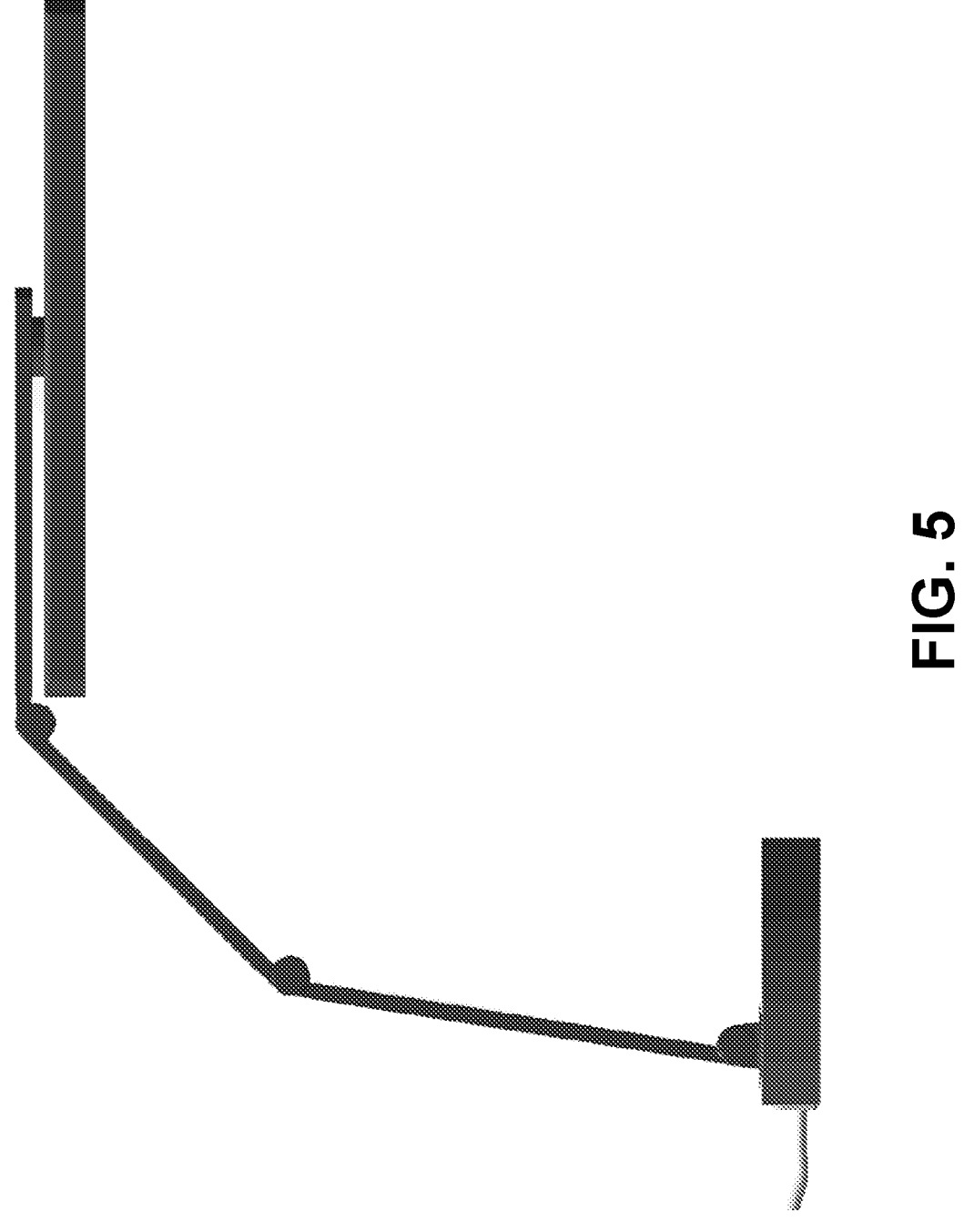

FIG. 3-5 show different side views of an illustrative heat lamp according to one or more aspects described herein. FIGS. 6-8 show illustrative views of a lamp head according to one or more aspects described herein. For example, FIG. 6 shows a heat lamp having at least two lighting elements 610 and 620 located at opposite ends of the lamp head and an IR heating element located within a cavity on the lower face of the lamp head. FIG. 7 shows a view of an end of the lamp head of an illustrative heat lamp. The lamp head may include the first opening 720 near the edge of the lamp head end with a second depression or opening 710 located on a top edge of the lamp head and that may clip into a retention feature on the base to secure the lamp head for storage and/or movement. FIG. 8 shows a view of the pivot 810 at the end of the last segment of the support arm that may connect to a top surface of the lamp head, such as at or near a center point of the lamp head. In some cases, the pivot 810 may be secured to the lamp head at a different location, such as at or near an end of the lamp head.

In some cases, an illustrative heat lamp may have a 300 W 120 VAC 60 Hz power rating and may come configured with a 12 American Wire Gauge (AWG) SWJ 3-wire power cord with 3-prong grounded plug. For example, the power cord may be rated for "junior severe" service as defined by the Underwriters Laboratories, at approximately 300 volts, 120 volts, 120/208 volts, 120/240 volts, 240 volts, or 277 volts. In some cases, the power cord may be rates as being weather and/or water resistant. The heat lamp base may include an integrated 20 A-rated 120 VAC grounded outlet in base for lamp interconnection and have at least some overcurrent protection (e.g., 5 A 120 VAC overcurrent protection) in lamp base. Some configurations of the heat lamp may have a single 5 A on/off switch to control heating and lighting functions together. Some configurations may include separate 5 A on/off switches to control heating and lighting functions separately. The lamp head may incorporate one or more heating elements and/or one or more lighting elements, such as a carbon fiber medium-wave IR heating element having a length between 8 and 13 inches (e.g., a 10-inch heating element, a 12-inch heating element). In some cases, the heating element may be configured at one or more power levels, such as about 200 Watts, about 300 Watts, about 400 Watts, about 600 Watts, and the like. The lighting elements may be one or more LED lamps that may illuminate surfaces and/or objects beneath the lamp head at a specified color temperature (e.g., at a 3000 k color temperature).

In some cases, the illumination light source may have a single lumen output setting. In some cases, the illumination light source may include one or more different lumen output settings, such as discrete lumen output settings and/or variable output settings. For example, the illumination light source may have two or more illumination output settings. For example, a "low light" (e.g., about 200 lumens, about 400 lumens, and/or a range between about 200 lumens and 400 lumens, etc.) setting, such as a lumen output setting between about 100 lumens and 500 lumens, may be provided for use in a low-light environment such that the heat lamp still puts a spot light on food without being overly distracting. For example, a stadium, theater, or other location where the lights have been turned off/lowered for a performance would be an ideal environment for the "low light" setting. In other cases, another lumen output setting such as a "high light environment" lumen output setting between about 500 lumens and 1000 lumens (e.g., about 700 lumens, about 900 lumens, about 1300 lumens, and/or a range of between about 500 lumens and 1300 lumens, etc.), may be provided for environments with more ambient light, such that the visible light source may provide a spotlight effect, so that the heated object is still noticeable.

The illumination light source may include one or more LEDs, but a variety of light sources may be used. In some cases, other light sources may include an incandescent light bulb, a compact florescent light bulb, or high-intensity discharge bulb. In some cases, a 4 or 5 watt LED may be used. A variety of bulbs, wattages or even number of light sources may be appropriate given the size, shape and other properties of the heat lamp, the food-serving system in which the heat lamp is to be used, and/or the desired visual aesthetic for the food items. The lighting element and/or heating elements may be configured for easy access to allow the elements to be user-replaceable by simple means.

In some cases, some or all of the outer surfaces of the heat lamp 100 may remain at a touch-safe temperature as defined by one or more industry or safety standards (e.g., below 140° F. at thermal equilibrium in 75° F. ambient conditions, natural convection). In some cases, one or more surfaces of the heat lamp 100 may increase to a temperature above a temperature rated as being touch safe. In such cases, a warning label or other such identifier (e.g., a color, a symbol, etc.) may be used to indicate a potential for an increased temperature at a particular surface. In some cases, a cover or other insulating material may be provided. The surfaces and/or components may be manufactured from materials and/or may be configured materials having a fingerprint resistant finish, such as plastic, metal (e.g., aluminum, brushed stainless steel, brushed nickel, etc.), glass, carbon fiber, wood, and the like, or a mixture of such materials. The surfaces may also be corrosion-resistant to steam and periodic cleaning processes of wiping with warm soapy water and/or chemicals having a pH in the range of about 2.0 to about 13.0 (e.g., vinegar to bleach). In some cases, the heat lamp is rated for no submersion. It may be contemplated that at least a portion of some heat lamp configurations may be rated as submersible, but is not required. The heat lamp may satisfy one or more international safety standards, such as by having an Electrical Testing Labs/Intertek (ETL) listing, an Underwriters Laboratories (UL) 197 approval, and/or the like.

In some cases, the heat lamp 100, 105 may include one or more sensors to monitor operation of the lamp. For example, the lamp head 142 or other portion of the lamp, may include one or more sensors to ensure proper and/or safe operating conditions of the lamp. For example, one or more portions of the lamp (e.g., the base 110, a segment 122, 124, 126, the lamp head 142, etc.) may include one or more heat sensors (e.g., thermistors) such as to ensure some or all of the outer surfaces of the heat lamp 100 may remain at a touch-safe temperature. If a predefined thermal limit is sensed, the heating element of the heat lamp may be disabled. In some cases, the heat lamp may reset automatically once the sensed temperature has reached a second predefined thermal limit at or beneath a touch-safe temperature set by the one or more industry standards. In some cases, a manual reset by a user may be required before the heating element may be re-enabled.

In some cases, the heat lamp 100 may include one or more tilt sensors (e.g., an inclinometer) that may be used to sense a tilt of the base and/or the lamp head. For example, a tilt sensor may be incorporated into the base 110, the lamp head 142, or both. In some cases, the tilt sensors may be used to sense an angle at which the base 110 and/or lamp head 142 is tilted from horizontal. For example, if the base 110 or lamp head 142 is sensed to be a predefined angle (e.g., about 15 degrees from horizontal, about 12 degrees from horizontal, etc.), the heating element will be turned off, thereby eliminating a risk of fire.

FIGS. 10-14 show illustrative views of a first illustrative heat lamp having a central pivot configuration according to one or more aspects described herein. FIGS. 15-20 show illustrative views of a second illustrative heat lamp having a rear pivot configuration according to one or more aspects described herein.

By directing heat from the lamp head onto any food items placed below the canopy in certain examples, these examples advantageously provide heat in a manner that allows a user to easily view and access the food items because, in certain implementations, there are no walls or doors between the customer and the food that extend down from the lamp head positioned above the items. In these and/or other embodiments, there may be no need for a cover immediately above the food items to retain heat that a customer must remove, or that may prevent or inhibit a customer from viewing the items. Thus, it is envisioned in certain embodiments that the system is devoid of any walls or other enclosing structures in between the lamp head and the food items. It also is envisioned in certain embodiments that the system is devoid of any cover placed immediately above the food items, for example a cover placed onto of a serving vessel containing the food. In addition, in certain embodiments the heat of the lamp head may be sufficient to prevent the collection of condensation from, e.g. steam from the food items, on the lamp head that may lower the aesthetic appeal of the food-serving system.

The noted innovation is disclosed above and in the accompanying drawings with reference to a variety of examples. The purpose served by the disclosure, however, is to provide examples of the various features and concepts related to the invention, not to limit the scope.

9

I claim:

1. A heat lamp comprising:
a portable base comprising an opening in a top surface of the portable base, wherein the opening receives a first end of a segmented support arm beneath the top surface of the portable base; and
an elongated lamp head coupled to a second end of the segmented support arm, the elongated lamp head having a rectangular cross section and comprising:
an opening at a distal end of the elongated lamp head;
an exposed cavity in a lower face of the elongated lamp head, wherein the exposed cavity is opposite a solid top surface of the elongated lamp head;
a heat element linearly aligned with the exposed cavity in the lower face of the elongated lamp head and located in the exposed cavity, wherein the exposed cavity is physically separate from the opening at the distal end of the elongated lamp head; and
at least one illumination element located within the opening at the distal end of the elongated lamp head, wherein a first width of the elongated lamp head is substantially the same as a second width of the segmented support arm, and wherein the opening at the distal end of the elongated lamp head passes through the elongated lamp head from a top surface of the elongated lamp head to a bottom surface of the elongated lamp head; and
wherein the segmented support arm is foldable to form a triangular storage position, wherein a first segment of the segmented support arm forms a handle separating the elongated lamp head from a second segment of the segmented support arm.

2. The heat lamp of claim 1, wherein the segmented support arm is rotatable about an axis perpendicular to the top surface of the portable base.

3. The heat lamp of claim 1, wherein the top surface of the elongated lamp head is parallel to a bottom surface of the elongated lamp head.

4. The heat lamp of claim 1, wherein the top surface of the elongated lamp head comprises a solid top surface, wherein the at least one illumination element is thermally separated from the heat element, and wherein the elongated lamp head comprises a thermal sensor used to maintain the solid top surface below a defined temperature.

5. The heat lamp of claim 1, wherein the segmented support arm includes at least two segments connected via a pivoting hinge.

6. The heat lamp of claim 1, wherein the distal end of the elongated lamp head is selectively positionable at an angle between 0 degrees and 90 degrees with respect to the segmented support arm.

7. The heat lamp of claim 1 further comprising a pivot connecting the second end of the segmented support arm to a portion of the elongated lamp head.

8. The heat lamp of claim 7, wherein the pivot is physically connected at a central location of the elongated lamp head.

9. The heat lamp of claim 7, wherein the pivot is physically connected at a distal end of the elongated lamp head.

10. The heat lamp of claim 1, wherein the segmented support arm is foldable to form a storage position comprising a connected portion of the opening at the distal end of the elongated lamp head to a feature on the portable base.

11. The heat lamp of claim 1, further comprising a rotating pivot associated with the opening in the top surface of the portable base.

12. The heat lamp of claim 11, wherein a movement of the rotating pivot rotates the segmented support arm about an axis perpendicular to the top surface of the portable base.

13. The heat lamp of claim 11, wherein a movement of the rotating pivot rotates the segmented support arm about an axis parallel to the top surface of the portable base.

14. A heat lamp comprising:
a portable base comprising a first opening in a top surface of the portable base and wherein the portable base comprises a single component;
a first segmented support arm rotatably coupled to the portable base via a first end of the first segmented support arm being inserted into the first opening of the portable base, wherein the first end of the first segmented support arm inserted into the first opening in the portable base is surrounded by the portable base; and
a first elongated lamp head coupled to a second end of the first segmented support arm, the first elongated lamp head comprising:
a solid top surface comprising an opening at a distal end of the first elongated lamp head;
a rectangular cross-section, wherein a first width of the first elongated lamp head is substantially the same as a second width of the first segmented support arm;
a bottom surface parallel to the solid top surface and comprising an open cavity exposed through the bottom surface opposite the solid top surface;
a heat element linearly aligned with the first elongated lamp head within the open cavity via the opening of the bottom surface, wherein the open cavity is physically separate from the opening at the distal end of the first elongated lamp head; and
at least one illumination element located within the opening at the distal end of the first elongated lamp head, wherein the opening at the distal end of the first elongated lamp head passes through the solid top surface of the first elongated lamp head and the bottom surface of the first elongated lamp head; and
wherein a first section of the first segmented support arm, when configured in a storage configuration, forms a triangular shape with the first elongated lamp head and a second section of the first segmented support arm.

15. The heat lamp of claim 14, wherein the portable base includes a second opening in the top surface of the portable base and wherein the heat lamp further comprises:
a second segmented support arm rotatably coupled to the portable base via a first end of the second segmented support arm; and
a second elongated lamp head coupled to a second end of the second segmented support arm, the second elongated lamp head comprising:
a second solid top surface comprising a second opening at a second distal end of the second elongated lamp head;
a second bottom surface opposite the solid top surface, wherein the second bottom surface comprises a second open cavity;
a heat element linearly aligned with the second elongated lamp head within the second open cavity, wherein the opening of the bottom surface comprises a cavity physically separate from the opening at the distal end of the second elongated lamp head; and
at least one illumination element located within the second opening at the second distal end of the second elongated lamp head, wherein a first width of the second elongated lamp head is substantially the same as a second width of the second segmented support arm.

16. The heat lamp of claim 14, further comprising a rotating pivot associated with the first opening in the top surface of the portable base.

17. The heat lamp of claim 16, wherein a movement of the rotating pivot rotates the first segmented support arm about an axis perpendicular to the top surface of the portable base.

18. An elongated lamp head comprising:

a pivoting member that rotatably attaches the elongated lamp head to a support arm, wherein the support arm elevates the elongated lamp head above an object to be heated, wherein a first width of the elongated lamp head is substantially the same as a second width of the support arm;

a solid top surface comprising an opening at a distal end of the elongated lamp head;

a bottom surface opposite the solid top surface comprising an open cavity comprising an opening within the bottom surface, wherein the open cavity is separate from the opening at the distal end of the elongated lamp head;

a heat element linearly aligned with the elongated lamp head within the opening of the bottom surface;

a thermal sensor used to maintain a surface temperature of at least the solid top surface of the elongated lamp head below a threshold temperature; and at least one illumination element located within an opening at the distal end of the elongated lamp head, wherein the opening at the distal end of the elongated lamp head extends from the solid top surface of the elongated lamp head to the bottom surface of the elongated lamp head; and wherein a first section of the support arm forms a carrying handle when positioned in a triangular storage configuration separating the elongated lamp head from a second section of the support arm.

19. The elongated lamp head of claim 18, wherein the pivoting member is physically connected at one of a distal end of the elongated lamp head or a central location of the solid top surface.

* * * * *